United States Patent
Pujol et al.

(10) Patent No.: US 8,925,863 B2
(45) Date of Patent: Jan. 6, 2015

(54) AIRCRAFT NOSE SECTION INCLUDING A LOCK FOR ACCESSING THE COCKPIT

(75) Inventors: Olivier Pujol, Montaigut sur Save (FR); Sebastien Lalande, Toulouse (FR)

(73) Assignee: Airbus, Blagnac (FR)

(*) Notice: Subject to any disclaimer, the term of this patent is extended or adjusted under 35 U.S.C. 154(b) by 0 days.

(21) Appl. No.: 13/504,715

(22) PCT Filed: Nov. 5, 2010

(86) PCT No.: PCT/FR2010/052389
§ 371 (c)(1),
(2), (4) Date: Apr. 27, 2012

(87) PCT Pub. No.: WO2011/055097
PCT Pub. Date: May 12, 2011

(65) Prior Publication Data
US 2012/0211601 A1 Aug. 23, 2012

(30) Foreign Application Priority Data
Nov. 6, 2009 (FR) ...................................... 09 57881

(51) Int. Cl.
  B64C 11/00 (2006.01)
  B64D 45/00 (2006.01)
  B64C 1/14 (2006.01)
(52) U.S. Cl.
  CPC .......... B64D 45/0015 (2013.01); B64C 1/1469 (2013.01); *B64D 2045/002* (2013.01)
  USPC .................................................... 244/118.5
(58) Field of Classification Search
  USPC .................. 244/129.5, 118.5, 129.4, 121
  See application file for complete search history.

(56) References Cited

U.S. PATENT DOCUMENTS

| 3,480,989 | A | * | 12/1969 | Edeus | ........................... 16/94 R |
| 3,704,845 | A | * | 12/1972 | Ord | ................................ 244/121 |
| 3,811,643 | A | | 5/1974 | Pizzo | |
| 4,597,549 | A | * | 7/1986 | Ryan | ........................... 244/118.5 |
| 6,474,599 | B1 | * | 11/2002 | Stomski | ...................... 244/118.5 |
| 7,249,737 | B2 | * | 7/2007 | Simmons et al. | ........... 244/129.5 |
| 7,530,529 | B2 | * | 5/2009 | Bock | ........................... 244/118.5 |

(Continued)

FOREIGN PATENT DOCUMENTS

EP 1 332 965 A1 8/2003
FR 2 910 436 A1 6/2008

OTHER PUBLICATIONS

French Preliminary Search Report issued Jun. 28, 2010 in Patent Application No. 0957881.

(Continued)

*Primary Examiner* — Tien Dinh
*Assistant Examiner* — Jessica Wong
(74) *Attorney, Agent, or Firm* — Oblon, Spivak, McClelland, Maier & Neustadt, L.L.P.

(57) ABSTRACT

An aircraft fuselage nose section having a secure access between the cockpit and the passenger cabin, while being compact. For that purpose, the nose section includes a separating mechanism including at least one movable element slidingly movable between: an extended closing position at which the separating mechanism bounds, with the cockpit door, a transition zone between the cockpit and the passenger cabin, and prevents people from passing between the passenger cabin and the transition zone; and a retracted opening position wherein the separating mechanism allows people to pass between the passenger cabin and the transition zone.

7 Claims, 5 Drawing Sheets

(56) References Cited

U.S. PATENT DOCUMENTS

| | | |
|---|---|---|
| 2003/0006342 A1 | 1/2003 | Page, Jr. |
| 2003/0136878 A1 | 7/2003 | Watson |
| 2003/0146347 A1* | 8/2003 | Roessner et al. ........... 244/129.5 |
| 2003/0169184 A1 | 9/2003 | Manten et al. |
| 2005/0116098 A1 | 6/2005 | Martens et al. |
| 2010/0219291 A1* | 9/2010 | Guering ..................... 244/118.5 |
| 2010/0219292 A1* | 9/2010 | Saint-Jalmes et al. ..... 244/118.5 |

OTHER PUBLICATIONS

International Search Report Issued Jul. 21, 2011 in PCT/FR10/52389 Filed Nov. 5, 2010.

* cited by examiner

FIG.5 ized in the Tournament of the AIRCRAFT NOSE SECTION INCLUDING A LOCK FOR ACCESSING THE COCKPIT

TECHNICAL FIELD

The present invention relates generally to the field of safety on board aircrafts and relates more particularly to an aircraft fuselage nose section comprising a cockpit communicating with a passenger cabin through a safety lock.

STATE OF PRIOR ART

Following the events of 11 Sep. 2001, it has become necessary to improve safety on board aircrafts, and in particular to secure access to the cockpit.

The cockpit was, before these events, separated from the passenger cabin only by a partition wall provided with a non-shielded cockpit door.

To resist to projectiles emitted by small arms, the cockpit door, and possibly the partition wall, have been shielded.

However, it remains important to avoid the intrusion into the cockpit of any unauthorised person, in particular upon momentarily opening the cockpit door.

Indeed, it is frequent that, during a flight, crew members have to come out or in the cockpit. The cockpit door is then momentarily opened and a malicious person can forcedly come in the cockpit.

It is possible to provide a safety lock between the cockpit and the passenger cabin.

Document FR2910436, filed on behalf of the applicant, describes a safety lock formed by a corridor closed at one end by the cockpit revolving door and at a second opposed end by a second revolving door. The corridor then forms, between said doors, a transition zone between the cockpit and the passenger cabin.

This solution however has the drawback to require a large size dedicated space, resulting from the bulk of the revolving doors, thus reducing the effective area of the passenger cabin. By effective area, it is meant herein the space currently available for the passenger transport.

Indeed, the dedicated space is formed by the corridor space, as well as the space necessary to the normal clearance of the second door. In the case where the second door opens inside the transition zone, the length of the corridor is then set by the need to allow said door to pivot normally. In the opposite case where the second door pivots outside the transition zone, that is in the passenger cabin, the effective area of the passenger cabin is reduced by the clearance zone of said door. In both cases, this safety lock has a high bulk which decreases the effective area of the passenger cabin. This infringes the current requirement in the aeronautics field for maximizing the passenger cabin zone in order to be able to transport a greater number of passengers.

Another solution is described in document EP1332965, on behalf of the applicant. The safety lock is formed by a cylindrical revolving drum rotatably mounted about a vertical axis on a frame structure. The drum then bounds an inner zone forming a transition zone. Said frame has a cylindrical revolving ring shape which enables the drum to be accommodated. The frame includes at least two door frame type openings, one on the cockpit side and the other on the passenger cabin side. The drum includes a single opening. The drum is rotatable so that the opening of the drum can be facing either of said openings of the frame.

However, this solution has also some drawbacks in terms of bulk and safety.

Even though the drum safety lock according to the second document does not have pivoting doors, the bulk remains high because the distance between both openings of the frame is imposed by the size of the drum, and in particular its diameter. This distance is in the order of the outer diameter of the drum. The area of the transition zone is then also imposed by the cylindrical shape of the drum and the frame. The safety lock thus has a high bulk detrimental to the effective area of the passenger cabin.

Besides, the lock according to this document necessarily includes an additional frame structure having a cylinder shape enabling on the one hand the drum to be accommodated and on the other hand to cooperate with the same so as to perform the technical function of safety lock. The presence of this structure results in a further bulk as well as an added weight detrimental to the aircraft performance.

Finally, the safety lock according to this document has a safety defect. Indeed, when someone wishes to access the cockpit, he/she must be present in the transition zone of the drum to ask for this. When the request is validated, the drum rotates such that the opening thereof faces the opening of the cockpit. However, there is a time lapse during which, whereas the request for accessing the cockpit is validated, the opening of the drum is at least partly facing the frame opening on yet the passenger cabin side. During this time lapse, it is possible for an unauthorised person to pass from the passenger cabin to the transition zone of the drum, which is particularly detrimental to the cockpit safety.

DESCRIPTION OF THE INVENTION

The object of the invention is mainly to provide an aircraft fuselage nose section including a secured access between the cockpit and the passenger cabin, while being compact.

For that purpose, an object of the invention is to provide an aircraft fuselage nose section including a cockpit, a cabin accessible to the passengers which is separated from said cockpit by a partition wall provided with a cockpit door, and separating means located on the passenger cabin side with respect to said partition wall and comprising at least one movable element.

By cockpit, it is meant herein the zone of the aircraft corresponding to the flight deck. The cockpit includes in particular the pilot seats as well as the aircraft control means.

By passenger cabin, it is meant herein the zone of the aircraft accessible to the passengers, and including in particular the seats enabling the passengers to be accommodated during the flight phases.

According to the invention, said movable element is slidingly movable between:

an extended closing position wherein said separating means bound, with said cockpit door, a transition zone between the cockpit and the passenger cabin, and prevent people from passing between the passenger cabin and said transition zone; and a retracted opening position wherein said separating means allow people to pass between the passenger cabin and said transition zone.

Thus, a safety lock can be formed between the cockpit and the passenger cabin.

The lock includes a cockpit door and the separating means. The transition zone is a temporary zone given that the perimeter thereof is defined when the movable element of the separating means assumes the extended closing position.

Unlike the previously described examples of prior art, the minimum distance between the cockpit door and the separating means when said movable element is in the extended closing position is not imposed by the structure or means of the safety lock.

Indeed, the movable element of the separating means is slidingly retractable and extendable. Therefore, it has no clearance zone inherent to any pivoting door.

Furthermore, the minimum distance between said movable element and said cockpit door is not imposed either by a possible frame ring structure such as that previously described in the second example of prior art.

Thus, unlike the abovementioned examples of prior art, the distance between the cockpit door and the movable element in the extended closing position can thus be optimized and decreased to a bare minimum, for example to the distance necessary for enabling someone to be in the transition zone thus defined. The area of the transition zone is thus minimized, which provides a particularly reduced bulk of the safety lock and enables consequently a high effective area of the passenger cabin to be obtained.

Besides, the safety lock does not have any additional frame structure having a cockpit opening and a passenger cabin opening. The invention thus enables a weight gain which is particularly advantageous for the aircraft performances. The integration of the safety lock into the global structure of the conventional aircraft nose sections can also be simply made, without complicating the assembly lines and the manufacturing procedures.

Finally, the safety lock has a high safety level given that the actuation of the separating means is independent of that of the cockpit door. Unlike the second example of prior art, the safety lock according to the invention does not have a time lapse during which an unauthorised person could unduly enter the lock, whereas the movable element would be closing. Indeed, when someone is present in the lock and asks for accessing for the cockpit, the movable element comes to assume, before any validation of the request, the extended closing position. Thus, the cockpit safety is ensured at any time.

The transition zone includes a floor. Preferably, the floor is common to the floor of the passenger cabin and the floor of the cockpit.

According to a first embodiment, said movable element is slidable along an axis parallel to said floor.

According to a second embodiment, said movable element is slidable along an axis orthogonal to said floor.

Advantageously, said movable element remains fully located, during its displacement between both said positions, along the perimeter of the transition zone adjoining the passenger cabin.

By perimeter of the transition zone adjoining the passenger cabin, it is intended the line along which are extended the separating means when said movable element assumes the extended closing position. The area of the transition zone is defined by the area defined by the cockpit door on the one hand and the separating means when said movable element assumes the extended closing position on the other hand, and obtained along a cross-section parallel to the floor plane of the safety lock. The floor plane of the safety lock is defined as a plane orthogonal to the aircraft plane of symmetry.

According to the invention, said movable element extends, in the extended closing position, along the entire perimeter of the transition zone adjoining the passenger cabin.

Advantageously, said separating means, when said movable element assumes said retracted opening position, bound with said cockpit door at least partly a zone having an area strictly lower than that of the transition zone.

The area of said zone defined when said movable element assumes the retracted opening position can be substantially zero or negligible.

The transition zone therefore is actually a temporary zone given that its perimeter is defined when the movable element assumes the extended closing position.

The passenger cabin thus has a maximized space since the area of the zone intended to form the transition zone is low or even negligible when the movable element is retracted.

Said movable element can be formed by a panel made as a single piece, by a plurality of panels wherein each of said panels is coupled to at least one contiguous panel, or even a grid or a curtain.

By panel, it is meant a plate or a board having generally a substantially rectangular shape. By contiguous panel, it is meant a panel adjacent to the considered panel. By panels coupled to each other, it is meant panels connected to each other by a mechanical connection. Thus, each panel of said plurality of panels can be connected to the contiguous panel(s) by any type of mechanical connection, for example a pivot or slide connection. Besides, the plurality of panels comprises at least two panels.

By grid, it is intended a lattice of bars of metal material or high strength plastics, the bars being connected two by two by a mechanical connection of, for example, the pivot type.

According to an alternative of the second embodiment, the floor of the transition zone separates a passenger transport upper zone from a so-called cargo lower zone. The cargo zone is provided under the passenger cabin along an axis orthogonal to the floor. Said floor includes an opening which extends along the perimeter of the transition zone adjoining the passenger cabin. Said movable element is then slidable through said opening so as to be accommodated, in the closing retracted position, in said cargo lower zone. The bulk of the safety lock is then minimum given that said movable element, in the retracted opening position, is not present at the passenger cabin.

According to another alternative of the second embodiment, said separating means include at least one side wall extending from said partition wall along part of a perimeter of the transition zone adjoining the passenger cabin. Said movable element is then rollingly mounted on a drum provided at the floor or a ceiling of the transition zone on the one hand, and slidably mounted on said side wall on the other hand.

Advantageously, to improve securing the cockpit access, said separating means are shielded. The cockpit door and the partition wall between the cockpit and the passenger cabin can also be shielded. The shielding allows in particular to resist to impacts of projectiles from fire arms.

The invention also relates to an aircraft including a fuselage nose section according to any of the previously described characteristics.

Further advantages and characteristics of the invention will appear in the detailed non-limiting description below.

BRIEF DESCRIPTION OF THE DRAWINGS

Embodiments of the invention will now be described, by way of non-limiting examples, referring to the appended drawings, wherein.

DETAILED DESCRIPTION OF A PREFERRED EMBODIMENT

Figure 1:
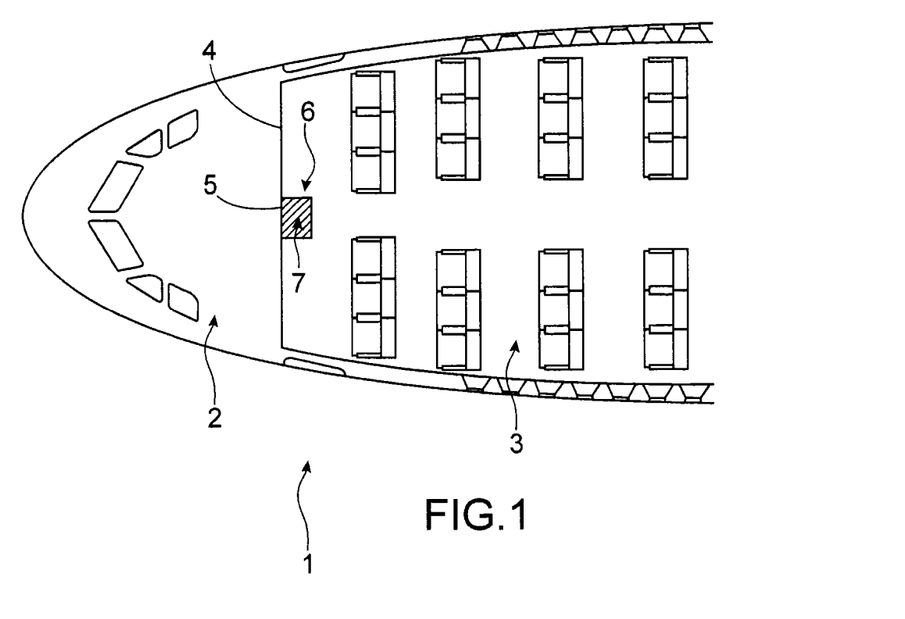
FIG. 1 is a schematic cross-section view of an aircraft fuselage nose section including a safety lock between the passenger cabin and the cockpit.

FIG. 1 schematically illustrates an aircraft fuselage nose section 1 including a safety lock to the cockpit according to the invention. The nose section 1 includes a cockpit 2 separated from a passenger cabin 3 by a partition wall 4 provided with a cockpit door 5. This nose section 1 is quite conventional. Accordingly, it is not necessary to describe it in more details.

The cockpit door 5 is pivotally mounted on said partition wall 4 and has a pivoting clearance which can be on the cockpit side or on the passenger cabin side. It can be shielded, as the partition wall, to resist to impacts of projectiles from fire arms.

The safety lock 6 according to the invention ensures communication between the cockpit 2 and the passenger cabin 3. It includes, besides the cockpit door 5, separating means located on the passenger cabin side with respect to said partition wall 4 and including at least one movable element.

Said movable element is slidingly movable between:
  an extended closing position wherein said separating means 9 bound, with said cockpit door 5, a transition zone 7 between the cockpit 2 and the passenger cabin 3, and prevent people from passing between the passenger cabin 3 and said transition zone 7; and
  a retracted opening position wherein said separating means allow people to pass between the passenger cabin 3 and said transition zone 7.

The safety lock 6 thus defines a temporary transition zone 7 located between the cockpit 2 and the passenger cabin 3. This transition zone 7 is bounded, on the one hand from the cockpit 2, by the cockpit door 5, and on the other hand from the passenger cabin 3, by the separating means when said movable element assumes said extended closing position.

Figure 2:
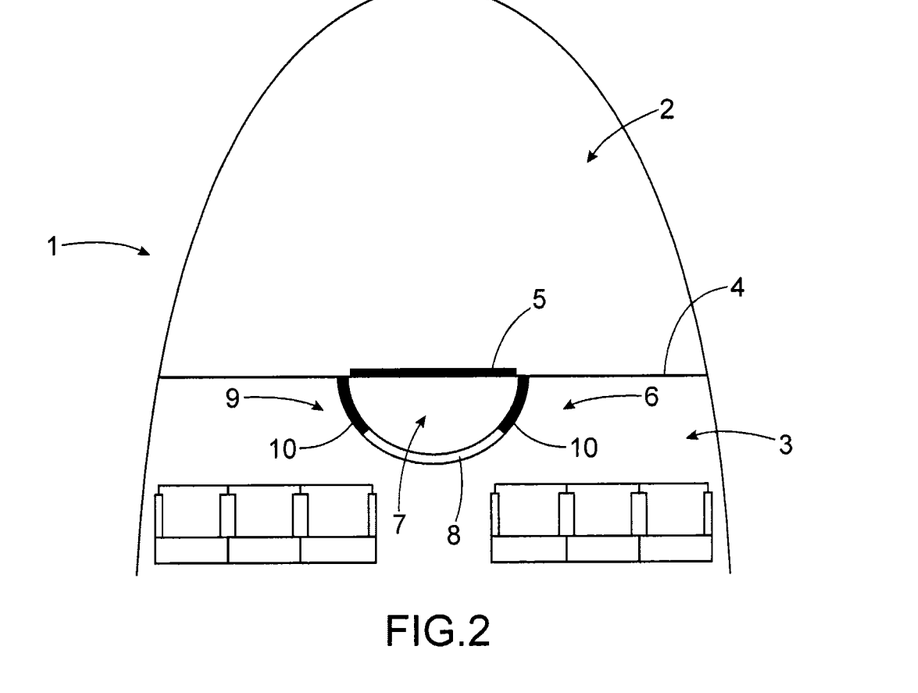
FIG. 2 is a schematic cross-section view of an aircraft fuselage nose section including a safety lock according to a first embodiment of the invention.
Figure 3:
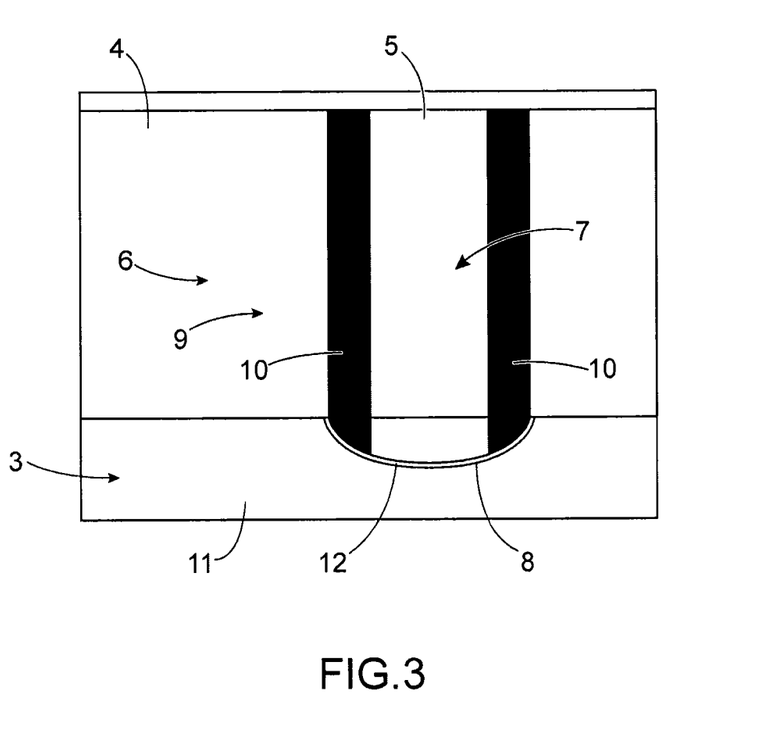
FIG. 3 is a schematic perspective view of the safety lock represented in FIG. 2.

FIGS. 2 and 3 illustrate an aircraft fuselage nose section, and more particularly a safety lock 6 including separating means 9 according to a first embodiment of the invention.

The perimeter 8 of the transition zone 7 of the safety lock 6 adjoining the passenger cabin 3 is formed into a circular arc shape.

The separating means 9 include two movable elements 10 each slidably mounted along an axis or path parallel to the floor 11 plane on a frame structure. The frame structure can be the floor 11 of the lock and of the passenger cabin. It can also be a ceiling of the lock and passenger cabin (not represented). The movable elements 10 are slidable in guide rails 12 mounted on said structure.

Each of the movable elements 10 is shaped like panel 10 made as a single piece, preferably shielded to resist to impacts of projectiles from fire arms.

The sliding path extends along said perimeter 8 of the transition zone 7 adjoining the passenger cabin, and thus is formed into circular arc shape.

When the sliding panels 10 assume the retracted opening position, they are brought back in the vicinity of the cockpit partition wall 4.

In this position, the sliding panels 10 are each accommodated inside one housing. Each said housing is, for example, a hollow box provided in the vicinity of the cockpit partition wall 4 and extending along part of the perimeter 8 of the transition zone 7 adjoining the passenger cabin.

Thus, the zone formed between the cockpit and the passenger cabin, and at least partially bounded by the cockpit door on the one hand and by the sliding panels 10 when they assume the retracted opening position on the other hand, has an area strictly lower with respect to that of the transition zone 7.

This area is herein negligible with respect to the area of the transition zone 7.

The transition zone 7 therefore is actually a temporary zone given that its perimeter is defined when the sliding panels 10 assume the extended closing position.

The passenger cabin thus has a maximized space since the area of the zone intended to form the transition zone 7 is low or even negligible when the panels 10 are retracted.

When the sliding panels 10 assume said extended closing position, they are substantially located outside their respective housing, far from the cockpit partition wall 4.

However, for better safety, said sliding panels 10 each include an end part which remains accommodated inside the housing. Thus, there is no opening between each of the sliding panels 10 and the associated housing. This opening indeed would be a weak point of the safety lock 6.

In this extended closing position, the assembly comprising said housing boxes and said sliding panels 10 substantially assumes the entire perimeter 8 of the transition zone 7 adjoining the passenger cabin 3. Thus, people cannot pass from the passenger cabin 3 to the transition zone 7.

Preferably, said housings are also shielded to resist to the impacts of projectiles from fire arms.

The operation of the safety lock 6 according to a first embodiment will now be described.

When the cockpit door 5 is in the closed position, the sliding panels 10 assume the retracted opening position.

Then, it is possible to access, from the passenger cabin 3, the transition zone 7 of the safety lock 6.

Thus, when someone wishes to access the cockpit, he/she comes inside the safety lock 6 by passing from the passenger cabin 3 to the transition zone 7.

An access request to the inside of the cockpit 2 is then made via a device placed inside the lock 6.

The sliding panels 10 then pass from the retracted opening position to the extended closing position.

During this position change, the panels 10 wholly slide along the perimeter 8 of the transition zone 7 adjoining the passenger cabin 3.

The sliding panels 10, in the extended closing position, then prevent any entry of a further person inside the safety lock 6.

The access request can then be validated to achieve the opening of the cockpit door 5.

It can be automatically validated by presenting an access card specific to authorised people. It can also be validated by the crew present inside the cockpit 2, by means of a camera or window type viewing device located in the cockpit door 5.

When the request is validated, the cockpit door 5 is unlocked and the person present in the safety lock 6 can access to the cockpit 2.

The cockpit door 5 is then closed and locked. The sliding panels 10 then pass from the extended closing position to the retracted opening position.

The procedure consisting of a person passing from the passenger cabin 3 to the cockpit 2 can then be renewed.

In the case where a person present in the cockpit 2 wishes to access the passenger cabin 3, he/she activates a device for opening the cockpit door 5. Before the cockpit door 5 is opened, the sliding panels 10 pass from their retracted opening position to the extended closing position.

The cockpit door 5 can thus be opened, without any risk of intrusion of an authorised person from the passenger cabin 3 to the cockpit 2.

The person comes in the transition zone 7 of the safety lock 6 and closes the cockpit door 5.

The sliding panels 10 then pass from the extended closing position to the retracted opening position.

The person can then access the passenger cabin 3.

The procedure consisting of a person passing from the passenger cabin 3 to the cockpit 2, or conversely, can then be renewed.

Thus, it appears that at no point of the procedure consisting of a person passing between the passenger cabin 3 and the cockpit 2, an unauthorised person can go into the cockpit 2 from the passenger cabin 3.

Besides, in the case of a power failure of the sliding panels 10, these can be manually actuated, without disturbing the piloting or passenger service operations performed during the flight.

Finally, in the case where the aircraft is free from passengers and that there is no risk of intrusion into the cockpit of a malicious person, the safety lock 6 cannot be actuated. Passing from the passenger cabin 3 to the cockpit 2 and conversely is simply made by the cockpit door 5, said movable element 10 remaining at the retracted opening position.

According to a first alternative (not represented) of the first embodiment of the invention, the separating means 9 only include a single sliding panel similar to one of those previously described. The width of the sliding panel 10 and that of the housing box are adapted, such that, when the sliding panel 10 is in the extended closing position, it prevents, by cooperating with its housing box, people from passing between the transition zone 7 and the passenger cabin 3.

When passing from the retracted position to the extended position, and conversely, the sliding panel 10 remains located at the perimeter 8 of the transition zone 7 adjoining the passenger cabin 3.

The operation of the safety lock 6 including a single sliding panel 10 according to this alternative is similar to that previously described in reference to the first embodiment.

A second alternative (not represented) of the first embodiment of the invention is now described.

According to this alternative, each of the sliding movable elements is formed by a plurality of sliding panels where each panel is coupled to the contiguous panel(s) thereof through a mechanical connection, for example a pivot or slide. Each panel is thus coupled to the immediate contiguous panels thereof, such that the movement of one of them causes the other to be moved.

The panels are slidably mounted on said frame structure through guide rails.

Each panel thus is formed into a circular arc shape.

When the sliding elements assume the retracted opening position, the panels are provided inside the housing boxes.

To limit the bulk along the perimeter of the transition zone adjoining the passenger cabin, the panels are then provided so as to overlap each other.

When the sliding elements assume the extended closing position, the panels are unfolded and extend along the perimeter of the transition zone adjoining the passenger cabin.

As for the different embodiments previously described, when passing from the retracted position to the extended position, and conversely, the sliding panels can remain located at the perimeter defined between the transition zone and the passenger cabin.

The operation of the safety lock including sliding elements according to this alternative is similar to that previously described in reference to the first embodiment.

Of course, it is possible to only provide a single movable element formed by a plurality of panels where each panel is coupled to the contiguous panel(s) thereof. Besides, and according to another alternative, said movable element(s) can be formed by a grid, for example of metal. As a safety precaution, the grid is shielded and has a sufficiently thin meshing to stop projectiles from fire arms. Alternatively, said movable element(s) can be formed by a metal curtain, preferably with solid shielded blades.

Figure 4:
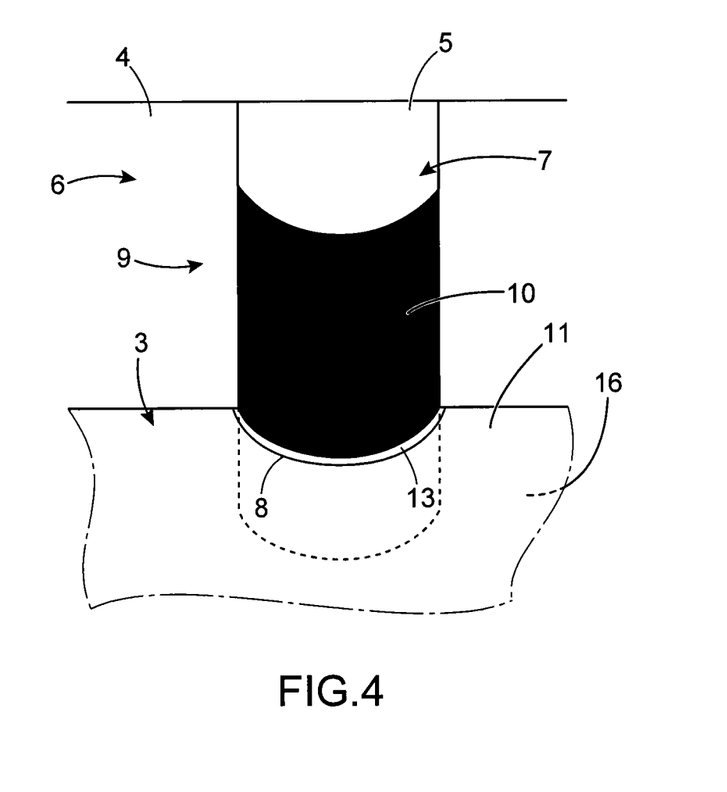
FIG. 4 is a schematic perspective view of the safety lock according to a second embodiment of the invention.

According to a second embodiment illustrated in FIG. 4, the movable element 10 of the separating means 9 can be formed by a single panel 10 made as a single piece slidably mounted along an axis substantially orthogonal to the floor 11 of the lock.

The floor 11 of the transition zone 7 separates a passenger transport upper zone from a so-called cargo lower zone 16. The cargo zone 16 is provided under the passenger zone along an axis orthogonal to the floor.

Said floor 11 includes an opening 13 which extends along the perimeter 8 of the transition zone 7 adjoining the passenger cabin 3.

Said panel 10 can thus slide through said opening 13 so as to be accommodated, in the closing retracted position, into said cargo lower zone 16. The bulk of the safety lock 6 is then minimum given that said sliding panel 10, in the retracted opening position, is not present at the passenger cabin 3.

Thus, the zone formed between the cockpit and the passenger cabin, and at least bounded by the cockpit door on the one hand and by the sliding panel 10 when it assumes the retracted opening position on the other hand, has an area strictly lower with respect to the transition zone 7.

This area is herein substantially zero or negligible.

The passenger cabin has actually a maximized space since the area of the zone intended to form the transition zone 7 is low or even negligible when the panel 10 is retracted.

To pass into the extended closing position, the sliding panel 10 is translated vertically upwards, that is from the cargo compartment to the safety lock 6. It is then located at the entire perimeter 8 of the transition zone 7 adjoining the passenger cabin 3.

As for the different embodiments previously described, when passing from the retracted position to the extended position, the sliding panel 10 remains advantageously located at said perimeter 8.

The operation of the safety lock 6 including a vertically sliding panel 10 is similar to that previously described in reference to the first embodiment.

Figure 5:
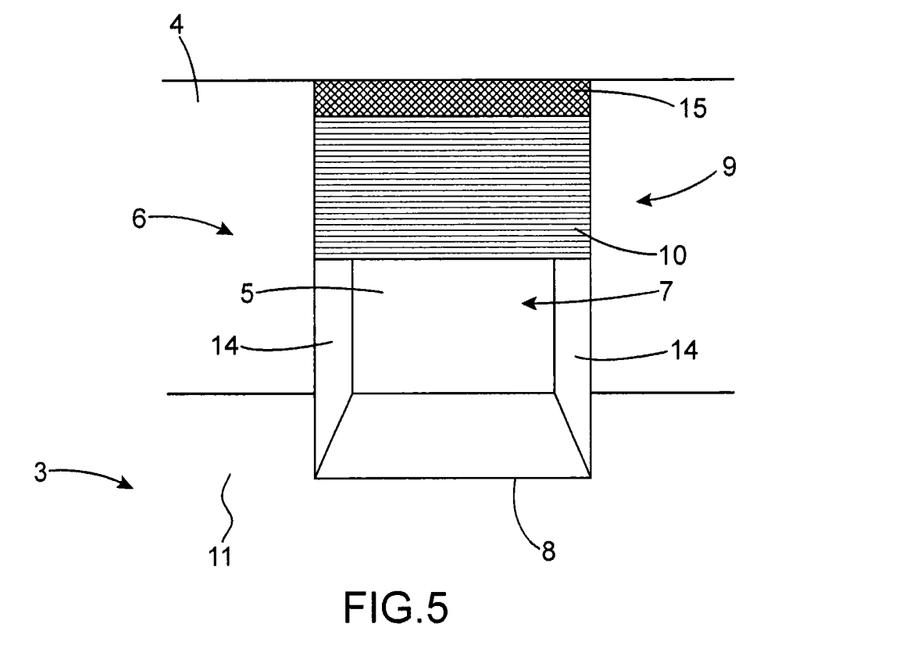
FIG. 5 is a schematic perspective view of the safety lock according to an alternative of the second embodiment of the invention.

According to an alternative of the second embodiment represented in FIG. 5, the movable element 10 of the separating means 9 is formed by a plurality of panels where each panel is coupled to the contiguous panel(s) thereof so as to form a sliding flap 10. The sliding flap can also be formed by a shielded grid having a sufficiently thin meshing to stop projectiles from fire arms. Alternatively, said flap can be formed by a metal curtain, preferably with solid shielded blades.

The separating means 9 further comprise two side walls 14 extending from the cockpit partition wall 4 along part of the perimeter 8 of the transition zone 7 adjoining the passenger cabin 3.

The flap 10 is rollingly mounted on a drum provided in a housing box 15.

The housing box 15 can be provided at the floor or the ceiling of the lock. FIG. 5 illustrates this last embodiment.

In the first case, the flap 10 passes from the retracted opening position to the extended closing position by extending vertically upwards, that is from the floor of the lock to the ceiling of the same.

In the second case (illustrated in FIG. 5), the flap 10 passes from the retracted opening position to the extended closing position by slidably extending vertically downwards, that is from the ceiling of the lock to the floor of the same. More precisely, the flap slides along guide rails mounted on the side walls 14.

As for the different embodiments described above, when passing from the retracted position to the extended position, and conversely, the rolling and sliding flap 10 remains advantageously located at the perimeter 8 of the transition zone 7 adjoining the passenger cabin 3.

The operation of the safety lock 6 according to this alternative is similar to that previously described in reference to the first embodiment.

Besides, it is also possible that the movable elements of the separating means be formed by two rolling flaps, both being accommodated, in the retracted position, in housing boxes provided at the lock ceiling and at the lock floor respectively.

Of course, various alterations can be made by those skilled in the art to the invention just described, only by way of non-limiting examples.

Besides, the transition zone 7 can be formed in a half-disk, square, rectangular or other shape. Depending on the cases, shielded side walls can be provided along the perimeter 8 of the transition zone 7 to cooperate with the separating means for the purpose to, when they are in a closing configuration, prevent people from passing between the transition zone 7 and the passenger cabin 3.

The invention claimed is:

1. An aircraft fuselage nose section comprising:
    a cockpit;
    a cabin accessible to passengers which is separated from said cockpit by a partition wall provided with a cockpit door; and
    at least one movable element located on the passenger cabin side with respect to said partition wall, said at least one movable element being slidingly movable between:
        an extended closing position wherein said at least one movable element bounds, together with said cockpit door, a transition zone between the cockpit and the passenger cabin, and prevents people from passing between the passenger cabin and said transition zone; and
        a retracted opening position wherein said at least one movable element allows people to pass between the passenger cabin and said transition zone,
    wherein said at least one movable element extends, in the extended closing position, along an entire perimeter of the transition zone adjoining the passenger cabin,
    wherein said transition zone includes a floor, said floor separating a passenger transport upper zone from a cargo lower zone, and including an opening which extends along a perimeter of the transition zone adjoining the passenger cabin, and
    wherein said at least one movable element is slidable through said opening so as to be accommodated, in the retracted opening position, in said cargo lower zone.

2. The aircraft fuselage nose section according to claim 1, wherein, when said at least one movable element assumes the retracted opening position, said at least one movable element bounds, together with said cockpit door, at least partly a zone having an area strictly lower than that of the transition zone.

3. The aircraft fuselage nose section according to claim 1, wherein said at least one movable element is slidable along an axis orthogonal to said floor.

4. The aircraft fuselage nose section according to claim 1, wherein said at least one movable element remains fully located, during its displacement between both said positions, along the perimeter of the transition zone adjoining the passenger cabin during displacement between the extended closing position and the retracted opening position.

5. The aircraft fuselage nose section according to claim 1, wherein said at least one movable element is formed by a panel made as a single piece.

6. An aircraft, comprising a fuselage nose section according to claim 1.

7. An aircraft fuselage nose section comprising:
    a cockpit;
    a cabin accessible to passengers which is separated from said cockpit by a partition wall provided with a cockpit door; and
    a separating device located on the passenger cabin side with respect to said partition, the separating device including at least one movable element that is slidingly movable between:
        an extended closing position wherein said separating device bounds, together with said cockpit door, a transition zone between the cockpit and the passenger cabin, and prevents people from passing between the passenger cabin and said transition zone; and
        a retracted opening position wherein said separating device allows people to pass between the passenger cabin and said transition zone,
    wherein said separating device extends, in the extended closing position, along an entire perimeter of the transition zone adjoining the passenger cabin, and
    wherein said transition zone includes a floor, said floor separating a passenger transport upper zone from a cargo lower zone, and including an opening which extends along a perimeter of the transition zone adjoining the passenger cabin, and wherein said movable element is slidable through said opening so as to be accommodated, in the retracted opening position, in said cargo lower zone.

* * * * *